United States Patent
Bogorad

(10) Patent No.: US 10,104,100 B1
(45) Date of Patent: Oct. 16, 2018

(54) SYSTEMS AND METHODS FOR DETECTING ANOMALIES THAT ARE POTENTIALLY INDICATIVE OF MALICIOUS ATTACKS

(71) Applicant: Symantec Corporation, Mountain View, CA (US)

(72) Inventor: Walter Bogorad, Danville, CA (US)

(73) Assignee: Symantec Corporation, Mountain View, CA (US)

( * ) Notice: Subject to any disclaimer, the term of this patent is extended or adjusted under 35 U.S.C. 154(b) by 186 days.

(21) Appl. No.: 15/059,326

(22) Filed: Mar. 3, 2016

(51) Int. Cl.
*H04L 29/06* (2006.01)

(52) U.S. Cl.
CPC ...... *H04L 63/1416* (2013.01); *H04L 63/1425* (2013.01)

(58) Field of Classification Search
None
See application file for complete search history.

(56) References Cited

U.S. PATENT DOCUMENTS

| | | | |
|---|---|---|---|
| 7,015,811 B2 | 3/2006 | Decker et al. | |
| 7,475,124 B2 | 1/2009 | Jiang et al. | |
| 7,673,074 B1 | 3/2010 | Sebastian et al. | |
| 7,861,300 B2 | 12/2010 | Arnold et al. | |
| 8,104,090 B1 | 1/2012 | Pavlyushchik | |
| 8,126,891 B2 | 2/2012 | Laxman et al. | |
| 8,341,745 B1 | 12/2012 | Chau et al. | |
| 8,544,087 B1 | 9/2013 | Eskin et al. | |
| 8,566,938 B1 | 10/2013 | Prakash et al. | |
| 8,621,626 B2 * | 12/2013 | Alme | G06F 21/563 726/23 |
| 8,925,037 B2 | 12/2014 | Marino et al. | |
| 8,973,133 B1 | 3/2015 | Cooley | |
| 9,053,516 B2 | 6/2015 | Stempora | |
| 9,088,560 B1 | 7/2015 | Newstadt et al. | |

(Continued)

FOREIGN PATENT DOCUMENTS

| | | |
|---|---|---|
| CN | 102571469 A | 7/2012 |
| CN | 102893289 A | 1/2013 |
| EP | 2515250 A1 | 10/2012 |

OTHER PUBLICATIONS

Steven Noel et al., "Correlating Intrusion Events and Building Attack Scenarios Through Attack Graph Distances", Computer Security Applications Conference, 2004. $20^{TH}$ Annual Tucson, AZ, USA Dec. 6-10, 2004, (Dec. 10, 2004), pp. 350-359.

(Continued)

*Primary Examiner* — Christopher Revak
(74) *Attorney, Agent, or Firm* — FisherBroyles, LLP

(57) ABSTRACT

A computer-implemented method for detecting anomalies that are potentially indicative of malicious attacks may include (1) identifying a sequence of activities performed on a computing device, (2) calculating a cumulative influence score between pairs of activities in the sequence of activities through convolution of the sequence of activities, (3) detecting an anomaly that is potentially indicative of a malicious attack based on a comparison of the cumulative influence score and an expected threshold for a user of the computing device, and (4) in response to detecting the anomaly, performing a security action. Various other methods, systems, and computer-readable media are also disclosed.

20 Claims, 7 Drawing Sheets

(56) References Cited

U.S. PATENT DOCUMENTS

| | | | |
|---|---|---|---|
| 9,141,790 | B2 | 9/2015 | Roundy et al. |
| 9,148,441 | B1 | 9/2015 | Tamersoy et al. |
| 9,166,997 | B1 | 10/2015 | Guo et al. |
| 9,256,739 | B1 | 2/2016 | Roundy et al. |
| 9,332,030 | B1 | 5/2016 | Pereira |
| 9,384,066 | B1 | 7/2016 | Leita et al. |
| 9,473,380 | B1 | 10/2016 | Bermudez et al. |
| 9,582,669 | B1 | 2/2017 | Shen et al. |
| 2002/0124089 | A1 | 9/2002 | Aiken et al. |
| 2004/0044771 | A1 | 3/2004 | Allred et al. |
| 2004/0059822 | A1 | 3/2004 | Jiang et al. |
| 2005/0030969 | A1 | 2/2005 | Fredriksson |
| 2005/0138413 | A1 | 6/2005 | Lippmann et al. |
| 2005/0249214 | A1* | 11/2005 | Peng ............... H04L 63/1458 709/224 |
| 2006/0095573 | A1 | 5/2006 | Carle et al. |
| 2006/0107321 | A1* | 5/2006 | Tzadikario ......... H04L 63/0227 726/22 |
| 2006/0236374 | A1 | 10/2006 | Hartman |
| 2008/0088408 | A1 | 4/2008 | Backman |
| 2008/0134327 | A1 | 6/2008 | Bharrat et al. |
| 2009/0144308 | A1 | 6/2009 | Huie et al. |
| 2009/0157365 | A1 | 6/2009 | Higuchi et al. |
| 2010/0186088 | A1 | 7/2010 | Banerjee et al. |
| 2010/0192226 | A1 | 7/2010 | Noel et al. |
| 2010/0235879 | A1 | 9/2010 | Burnside et al. |
| 2010/0281539 | A1* | 11/2010 | Burns ............... H04L 63/1441 726/23 |
| 2011/0019774 | A1 | 1/2011 | Furuta |
| 2011/0047620 | A1 | 2/2011 | Mahaffey et al. |
| 2011/0083180 | A1 | 4/2011 | Mashevsky et al. |
| 2011/0302656 | A1 | 12/2011 | El-Moussa |
| 2011/0314546 | A1 | 12/2011 | Aziz et al. |
| 2011/0320617 | A1 | 12/2011 | Annamalaisami et al. |
| 2012/0144468 | A1 | 6/2012 | Pratt et al. |
| 2012/0233683 | A1 | 9/2012 | Ibrahim et al. |
| 2013/0031037 | A1 | 1/2013 | Brandt et al. |
| 2013/0042294 | A1 | 2/2013 | Colvin et al. |
| 2013/0212659 | A1 | 8/2013 | Maher et al. |
| 2013/0333032 | A1 | 12/2013 | Delatorre et al. |
| 2014/0226664 | A1 | 8/2014 | Chen et al. |
| 2014/0258379 | A1 | 9/2014 | L'Heureux et al. |
| 2014/0330977 | A1 | 11/2014 | van Bemmel |
| 2014/0365646 | A1 | 12/2014 | Xiong |
| 2015/0113638 | A1 | 4/2015 | Valasek et al. |
| 2015/0150124 | A1 | 5/2015 | Zhang et al. |
| 2015/0261655 | A1 | 9/2015 | Versteeg et al. |
| 2015/0281047 | A1 | 10/2015 | Raju et al. |
| 2016/0261482 | A1 | 9/2016 | Mixer et al. |
| 2016/0378980 | A1* | 12/2016 | Ijiro ................ G06F 21/55 726/23 |
| 2017/0099311 | A1* | 4/2017 | Kesin ............... G06N 7/005 |
| 2017/0118234 | A1* | 4/2017 | Arora ............... H04L 63/1425 |

OTHER PUBLICATIONS

Extending schedulability analysis of Controller Area Network (CAN) for mixed (periodic/sporadic) messages (http://ieeexplore.ieee.org/document/60590101); Sep. 5, 2011.

A structured approach to anomaly detection for in-vehicle networks (http://ieeexplore.ieee.org/stamp/stamp.jsp?arnumber=5604050); Aug. 23, 2010.

Intrusion Detection Systems (IDS) Part 2—Classification; methods; techniques (http://www.windowsecurity.com/articles-tutorials/intrusion_detection/IDS-Part2-Classification-methods-techniques.html); Jun. 15, 2014.

Vishal Bajpai et al.; System and Method for Identifying an Invalid Packet on a Controller Area Network (CAN) Bus; U.S. Appl. No. 15/056,864, filed Feb. 29, 2016.

Vishal Bajpai et al.; Systems and Methods for Identifying Suspicious Controller Area Network Messages; U.S. Appl. No. 15/587,762, filed May 5, 2017.

Steven Noel et al.; Correlating Intrusion Events and Building Attack Scenarios Through Attack Graph Distances; 20th Annual Computer Security Applications Conference; ACSAC '04; Tucson, AZ, USA; Dec. 6-10, 2004.

Mahoney, Network traffic anomaly detection based on packet bytes, Proceedings of the 2003 ACM symposium on Applied computing, pp. 346-350, Mar. 9, 2003.

Balthrop et al., Revisiting LISYS: Parameters and Normal Behavior, Proceedings of the 2002 Congress on Evolutionary Computation, pp. 1045-1050, May 12, 2002.

Lee et al., Data mining approaches for intrusion detection, Proceedings of the 7th conference on USENIX Security Symposium—vol. 7, p. 6, Jan. 26, 1998.

Clifton et al., Developing custom intrusion detection filters using data mining, MILCOM 2000. 21st Century Military Communications Conference Proceedings, vol. 1, pp. 440-443, Oct. 22, 2000.

Bloedorn et al., Data Mining for Improving Intrusion Detection, http://www.mitre.org/sites/default/files/pdf/bloedorn_spss.pdf, Sep. 18, 2015.

Lee et al., Information-theoretic measures for anomaly detection, 2001 IEEE Symposium on Security and Privacy, pp. 130-143, May 13, 2001.

Yang et al., Anomaly detection and diagnosis in grid environments, Proceedings of the 2007 ACM/IEEE conference on Supercomputing, p. 33, Nov. 10, 2007.

Wang et al., Anomalous Payload-Based Network Intrusion Detection, Seventh International Workshop on Recent Advances in Intrusion Detection, pp. 203-222, Sep. 15, 2004.

Dussel et al., Cyber-Critical Infrastructure Protection Using Real-Time Payload-Based Anomaly Detection, 4th International Workshop on Critical Information Infrastructures Security, pp. 85-97, Sep. 30, 2009.

Tongaonkar et al., Towards self adaptive network traffic classification, Computer Communications, vol. 56, pp. 35-46, Feb. 1, 2015.

Bermudez et al., Automatic protocol field inference for deeper protocol understanding, IFIP Networking Conference (IFIP Networking), 2015, pp. 1-9, May 20, 2015.

Taylor et al., Frequency-based anomaly detection for the automotive CAN bus, 2015 World Congress on Industrial Control Systems Security (WCICS), pp. 45-49, Dec. 14, 2015.

Theissler, Anomaly detection in recordings from in-vehicle networks. pdf, Big Data Applications and Principles, First International Workshop, BIGDAP 2014, Madrid, Spain, Sep. 11, 2014.

Muter et al., A structured approach to anomaly detection for in-vehicle networks, 2010 Sixth International Conference on Information Assurance and Security (IAS), Atlanta, GA, pp. 92-98, Aug. 23, 2010.

Kleberger; Security Aspects of the In-Vehicle Network in the Connected Car; Intelligent Vehicles Symposium (IV), 2011 IEEE, Baden-Baden, Germany, reference: pp. 528-533, Jun. 5-9, 2011.

Muter; Entropy-based anomaly detection for in-vehicle networks; 2011 IEEE Intelligent Vehicles Symposium (IV), DOI: 10.1109/IVS.2011.5940552, Baden-Baden, Germany, reference: pp. 1110-1115, Jun. 5-9, 2011.

Bayer; Automotive Security Testing—The Digital Crash Test; http://www.sia.fr/images/images/Image/Evenements/2014/CESA/available%20papers/09_Bayer_Escrypt.pdf, as accessed Feb. 9, 2015; 3rd CESA Automotive Electronics Congress (CESA 3.0), Paris, France, Dec. 3-4, 2014.

Ben Othmane; Towards Extended Safety in Connected Vehicles; Proceedings of the 16th International IEEE Annual Conference on Intelligent Transportation Systems (ITSC 2013), The Hague, The Netherlands, Oct. 6-9, 2013.

Bourns Type 6002 Non-contacting Steering Angle Sensor; http://www.we-conect.com/cms/media/uploads/events/415/dokumente/Bourns_-_Non-Contacting_Steering_Angle_Sensor_Type_6002.pdf, as accessed Aug. 29, 2014, on or before Aug. 29, 2014.

CAN protocol specification; http://www.can-cia.org/index.php?id=164, as accessed Aug. 29, 2014, Oct. 17, 2010.

Controller Area Network (CAN) Overview; http://www.ni.com/white-paper/2732/en/, as accessed Aug. 29, 2014; National Instruments Corporation, Aug. 1, 2014.

(56) References Cited

OTHER PUBLICATIONS

Driver Feedback; https://play.google.com/store/apps/details?id=com.statefarm.driverfeedback, as accessed Aug. 29, 2014; State Farm Insurance, Android Apps on Google Play, Jun. 2, 2013.
Electronic control unit; https://en.wikipedia.org/wiki/Electronic_control_unit, as accessed Feb. 9, 2015; Wikipedia, Jul. 28, 2004.
EMI/ESD Protection Solutions for the CAN Bus; http://www.onsemi.com/pub_link/Collateral/AND8169-D.PDF, as accessed Aug. 29, 2014; Publication Order No. AND8169/D, ON Semiconductor, Semiconductor Components Industries, LLC, Jun. 2014—Rev. 2.
Emulation; https://en.wikipedia.org/wiki/Emulation, as accessed Feb. 9, 2015; Wikipedia,Dec. 3, 2003.
FlexRay Automotive Communication Bus Overview; http://www.ni.com/white-paper/3352/en/, as accessed Aug. 29, 2014; National Instruments Corporation, Aug. 21, 2009.
Hardware emulation; https://en.wikipedia.org/wiki/Hardware_emulation, as accessed Feb. 9, 2015; Wikipedia, Sep. 13, 2006.
Koscher; Experimental Security Analysis of a Modern Automobile; http://www.autosec.org/pubs/cars-oakland2010.pdf, as accessed Feb. 9, 2015; 2010 IEEE Symposium on Security and Privacy, 2010.
Lepkowski; EMI/ESD protection solutions for the CAN bus; http://www.can-cia.org/fileadmin/cia/files/icc/10/cia_paper_lepkowski.pdf, as accessed Aug. 29, 2014; iCC 2005, CAN in Automation, 2005.
Miller; A Survey of Remote Automotive Attack Surfaces; http://www.ioactive.com/pdfs/Remote_Automotive_Attack_Surfaces.pdf, as accessed Aug. 29, 2014; Black Hat USA 2014, Las Vegas, NV, Aug. 2-7, 2014.
Nathan Evans, et al; Systems and Methods for Detecting Anomalous Messages in Automobile Networks; U.S. Appl. No. 14/525,792, filed Oct. 28, 2014.
Nathan Evans, et al; Systems and Methods for Evaluating Electronic Control Units Within Vehicle Emulations; U.S. Appl. No. 14/671,036, filed Mar. 27, 2015.
Regev; Automotive Ethernet Security Testing; http://standards.ieee.org/events/automotive/2014/20_Automotive_Ethernet_Security_Testing.pdf, as accessed Feb. 9, 2015, 2014.
Snapshot; https://www.progressive.com/auto/snapshot/, as accessed Aug. 29, 2014; Progressive Casualty Insurance Company, Mar. 8, 2013.
Vehicle bus; https://en.wikipedia.org/wiki/Vehicle_bus, as accessed Feb. 9, 2015; Wikipedia, May 12, 2005.
Volvo tests Cloud-based V2V ice warning concept; http://telematicsnews.info/2014/03/19/volvo-tests-cloud-based-v2v-ice-warning-sharing_m5202/, as accessed Aug. 29, 2014; Telematics News, Mar. 19, 2014.
Wolf; Security in Automotive Bus Systems; http://www.weika.eu/papers/WolfEtAl_SecureBus.pdf, as accessed Aug. 29, 2014, 2004.
Yun Shen, et al; Systems and Methods for Detecting Discrepancies in Automobile-Network Data; U.S. Appl. No. 14/525,715, filed Oct. 28, 2014.
Bajpai, et al; Systems and Methods for Detecting Suspicious Microcontroller Messages; U.S. Appl. No. 15/143,284, filed Apr. 29, 2016.
Michael Pukish, et al; Systems and Methods for Detecting Transactional Message Sequences That Are Obscured in Multicast Communications; U.S. Appl. No. 15/194,337, filed Jun. 27, 2016.
Adam Glick, et al.; Systems and Methods for User-Directed Malware Remediation; U.S. Appl. No. 13/419,360, filed Mar. 13, 2012.
Carey Nachenberg, et al.; Systems and Methods for Neutralizing File-Format-Specific Exploits Included Within Files Contained Within Electronic Communications; U.S. Appl. No. 13/418,332, filed Mar. 12, 2012.
Leylya Yumer, et al.; Systems and Methods for Analyzing Zero-Day Attacks; U.S. Appl. No. 13/901,977, filed May 24, 2013.
Kyumin Lee, et al.; Content-Driven Detection of Campaigns in Social Media; CIKM'11; Oct. 24-28, 2011; ACM; Glasgow, Scotland, UK; http://faculty.cs.tamu.edu/caverlee/pubs/lee11cikm.pdf, as accessed Aug. 8, 2013.
Monowar H. Bhuyan, et al.; AOCD: An Adaptive Outlier Based Coordinated Scan Detection Approach; International Journal of Network Security; Nov. 2012; pp. 339-351; vol. 14, No. 6; http://www.cs.uccs.edu/~jkalita/papers/2012/BhuyanMonowarIJNS2012.pdf, as accessed Aug. 8, 2013.
William Eberle, et al., Graph-based approaches to insider threat detection; CSIIRW '09 Proceedings of the 5th Annual Workshop on Cyber Security and Information Intelligence Research: Cyber Security and Information Intelligence Challenges and Strategies; 2009; Article No. 44; ACM; http://dl.acm.org/citation.cfm?id=1558658, as accessed Aug. 8, 2013.
Splunk, Inc.; Detecting Advanced Persistent Threats—Using Splunk for APT; Jan. 4, 2012; Tech Brief; http://www.splunk.com/web_assets/pdfs/secure/Splunk_for_APT_Tech_Brief.pdf, as accessed Aug. 8, 2013.
Triumfant, Inc.; Detecting the Advanced Persistent Threat; Nov. 30, 2010; www.triumfant.com/advanced_persistent_threat.asp, as accessed Aug. 8, 2013.
EMC Corporation; Advanced Persistent Threat (APT) and Rootkit Detection; 2012; http://www.siliciumsecurity.com/advanced-persistent-threats-and-rootkits-detection/, as accessed Aug. 8, 2013.
Fanglu Guo, et al; Systems and Methods for Reducing False Positives When Using Event-Correlation Graphs to Detect Attacks on Computing Systems; U.S. Appl. No. 14/031,044, filed Sep. 19, 2013.
Colom Be, Jeffrey B., et al., "Statistical profiling and visualization for detection of malicious insider attacks on computer networks", http://dl.acm.org/citation.cfm?id=1029231, as accessed Nov. 13, 2013, VizSEC/DMSEC '04 Proceedings of the 2004 ACM workshop on Visualization and data mining for computer security, ACM, New York, NY, (2004), 138-142.
Wang, Wei et al., "Diffusion and graph spectral methods for network forensic analysis", http://dl.acm.org/citation.cfm?id=1278956, as accessed Nov. 13, 2013, NSPW '06 Proceedings of the 2006 workshop on New security paradigms, ACM, New York, NY, (2006), 99-106.
Julisch, Klaus "Clustering intrusion detection alarms to support root cause analysis", http://dl.acm.org/citation.cfm?id=950192, as accessed Nov. 13, 2013, ACM Transactions on Information and System Security (TISSEC), vol. 6, Issue 4, ACM, New York, NY, (Nov. 2003), 443-471.
Treinen, James J., et al., "A framework for the application of association rule mining in large intrusion detection infrastructures", http://dl.acm.orgicitation.cfm?id=2166375, as accessed Nov. 13, 2013, RAID'06 Proceedings of the 9th international conference on Recent Advances in Intrusion Detection, Springer-Verlag Berlin, Heidelberg, (2006), 1-18.
Gu, Guofei et al., "BotHunter: detecting malware infection through IDS-driven dialog correlation", http://dl.acm.org/citation.cfm?id=1362915, as accessed Nov. 13, 2013, SS'07 Proceedings of 16th USENIX Security Symposium on USENIX Security Symposium, Article No. 12, USENIX Association, Berkeley, CA, (2007).
Valdes, Alfonso et al., "Probabilistic Alert Correlation", http://dl.acm.org/citation.cfm?id=670734, as accessed Nov. 13, 2013, RAID '00 Proceedings of the 4th International Symposium on Recent Advances in Intrusion Detection, Springer-Verlag, London, UK, (2001), 54-68.
Alsubhi, Khalid et al., "FuzMet: a fuzzy-logic based alert prioritization engine for intrusion detection systems", http://dl.acm.org/citation.cfm?id=2344711, as accessed Nov. 13, 2013, International Journal of Network Management, vol. 22 Issue 4, John Wiley & Sons, Inc., New York, NY, (Jul. 2012).
Zamlot, Loai et al., "Prioritizing intrusion analysis using Dempster-Shafer theory", http://dl.acm.org/citation.cfm?id=2046694, as accessed Nov. 13, 2013, AISec '11 Proceedings of the 4th ACM workshop on Security and artificial intelligence, ACM, New York, NY, (2011), 59-70.
Oliner, Adam J., et al., "Community epidemic detection using time-correlated anomalies", http://dl.acm.org/citation.cfm?id=1894191, as accessed Nov. 13, 2013, RAID'10 Proceedings of the 13th international conference on Recent advances in intrusion detection, Springer-Verlag Berlin, Heidelberg, (2010), 360-381.

(56) References Cited

OTHER PUBLICATIONS

Ning, Peng et al., "Constructing attack scenarios through correlation of intrusion alerts", http://reeves-students.csc.ncsu.edu/papers-and-other-stuff/2002-10-ccs-constructing-attack-scenarios-paper.pdf, as accessed Nov. 13, 2013, CCS '02 Proceedings of the 9th ACM conference on Computer and communications security, ACM, Washington, DC, (Nov. 18-22, 2002), 245-254.

Wang, Wei et al., "A Graph Based Approach Toward Network Forensics Analysis", http://dl.acm.org/citation.cfm?id=1410238, as accessed Nov. 13, 2013, ACM Transactions on Information and System Security (TISSEC), vol. 12, Issue 1, Article No. 4, ACM, New York, NY, (Oct. 2008).

Valeur, Fredrik et al., "A Comprehensive Approach to Intrusion Detection Alert Correlation", http://dl.acm.org/citation.cfm?id=1038251, as accessed Nov. 13, 2013, IEEE Transactions on Dependable and Secure Computing, vol. 1, Issue 3, IEEE Computer Society Press, Los Alamitos, CA, (Jul. 2004), 146-169.

Tedesco, Gianni et al., "Real-Time Alert Correlation with Type Graphs", http://dl.acm.org/citation.cfm?id=1496279, as accessed Nov. 13, 2013, ICISS '08 Proceedings of the 4th International Conference on Information Systems Security, Springer-Verlag Berlin, Heidelberg, (2008), 173-187.

Wang, Wei et al., "Network Forensics Analysis with Evidence Graphs", http://www.dfrws.org/2005/proceedings/wang_evidencegraphs.pdf, as accessed Nov. 13, 2013, 2005 Digital Forensic Research Workshop (DFRWS), New Orleans, LA, (2005).

Wang, Ting et al., "Microscopic Social Influence", http://www.cc.gatech.edu/~lingliu/papers/2012/TingWang-SDM2012.pdf, as accessed Nov. 13, 2013, SDM 2012, (2012).

Ugander, Johan et al., "Balanced Label Propagation for Partitioning Massive Graphs", https://people.cam.cornell.edu/~jugander/papers/wsdm13-blp.pdf, as accessed Nov. 13, 2013, WSDM'13, ACM, Rome, Italy, (Feb. 4-8, 2013).

Ayday, Erman et al., "Iterative Trust and Reputation Management Using Belief Propagation", http://www.ece.gatech.edu/research/labs/WCCL/BP_publications/BP-ITRM-journal.pdf, as accessed Nov. 13, 2013, IEEE Transactions on Dependable and Secure Computing, vol. 9, No. 3, IEEE Computer Society, (May/Jun. 2012), 375-386.

Bruce Mccorkendale, et al; Systems and Methods for Detecting Malware; U.S. Appl. No. 13/422,702, filed Mar. 16, 2012.

Acar Tamersoy, et al; Systems and Methods for Adjusting Suspiciousness Scores in Event-Correlation Graphs; U.S. Appl. No. 14/138,891, filed Dec. 23, 2013.

Paleari, Roberto et al., "Automatic Generation of Remediation Procedures for Malware Infections", https://www.usenix.org/legacy/event/sec10/tech/full_papers/Paleari.pdf, as accessed Feb. 6, 2014, USENIX Security'10 Proceedings of the 19th USENIX conference on Security, USENIX Association, Berkeley, CA, (2010).

"Combating Advanced Persistent Threats—How to prevent, detect, and remediate APTs", http://www.mcafee.com/us/resources/white-papers/wp-combat-advanced-persist-threats.pdf, as accessed Feb. 6, 2014, McAfee, Inc., Santa Clara, CA, (2011).

"Advanced Persistent Threat (APT) Attack & Zero-Day Protection", http://www.fireeye.com/, as accessed Feb. 6, 2014, FireEye, Inc., (2006).

"Advanced Threat Defense", http://www.fidelissecurity.com/advanced-persistent-threat-protection, as accessed Feb. 6, 2014, General Dynamics Fidelis Cybersecurity Solutions, Inc., (2013).

"Mandiant for Security Operations", https://www.mandiant.com/products/mandiant-platform/security-operations, as accessed Feb. 6, 2014, Mandiant, A FireEye Company, (Mar. 1, 2013).

"Mandiant for Intelligent Response", http://www.mandiant.com/products/mandiant-platform/intelligent-response, as accessed Feb. 6, 2014, Mandiant, A FireEye Company, (Mar. 1, 2013).

"Solera Networks Inc.", http://www.soleranetworks.com/, as accessed Feb. 6, 2014, (Feb. 16, 2005).

"LogRhythm, Inc.", http://www.logrhythm.com/, as accessed Feb. 6, 2014, (Oct. 18, 2000).

Kevin Alejandro Roundy, et al; Systems and Methods for Using Event-Correlation Graphs to Generate Remediation Procedures; U.S. Appl. No. 14/221,703, filed Mar. 21, 2014.

Eberle, William et al., "Insider Threat Detection Using Graph-Bases Approaches", http://www.eecs.wsu.edu/-holder/pubs/EberleCATCH09.pdf, Cybersecurity Applications & Technology Conference for Homeland Security, (Jan. 2009).

Constantin, Lucian, "Attackers used known exploit to steal customer log-in credentials, vBulletin maker says", http://www.networkworld.com/article/2171967/access-control/attackers-used-known-exploit-to-steal-customer-log-in-credentials--vbulletin-maker-sa.html, IDG News Service, Network World, (Nov. 18, 2013).

"Recovery Manager for Active Directory Forest Edition", http://software.dell.com/documents/recovery-manager-for-active-directory-forest-edition-datasheet-26622.pdf, Dell, Inc., (Nov. 2013).

Scarfone, Karen et al., "Guide to Intrusion Detection and Prevention Systems (IDPS)", http://csrc.nist.gov/publications/nistpubs/800-94/SP800-94, National Institute of Standards and Technology, Special Publication 800-94, (Feb. 2007).

Dezert, Jean et al., "On the Validity of Dempster-Shafer Theory", Fusion 2012—15th International Conference on Information Fusion, Singapour, Singapore, (Jul. 2012).

Kevin Roundy, et al; Systems and Methods for Using Event-Correlation Graphs to Detect Attacks on Computing Systems; U.S. Appl. No. 14/041,762, filed Sep. 30, 2013.

Ilya Sokolov, et al; Systems and Methods for Notifying Contacts About the Status of Persons Impacted by Significant Unforeseen Events; U.S. Appl. No. 14/525,244, filed Oct. 28, 2014.

"Google now", http://www.google.com/landing/now/#whatisit, as accessed Aug. 28, 2014, (Jun. 28, 2012).

"Bing Maps", http://www.bing.com/maps/, as accessed Aug. 28, 2014, (Jun. 11, 2009).

"Google Now", https://plus.google.com/+google/posts/WhNRboMLynU, as accessed Aug. 18, 2015, (Mar. 29, 2014).

Keith Newstadt, et al; Systems and Methods for Validating Login Attempts Based on User Location; U.S. Appl. No. 14/197,687, filed Mar. 5, 2014.

Keith Newstadt; Systems and Methods for Validating Login Attempts Based on User Location; U.S. Appl. No. 14/735,195, filed Jun. 10, 2015.

Michael Shavell, et al; Systems and Methods for Storing Information About Transmission Control Protocol Connections; U.S. Appl. No. 14/314,263, filed Jun. 25, 2014.

Haas, Juergen; SYN flood; http://linux.about.com/cs/linux101/g/synflood.htm, as accessed Jul. 10, 2014; About.com.

Shane Pereira; Systems and Methods for Thwarting Illegitimate Initialization Attempts; U.S. Appl. No. 14/485,287, filed Sep. 12, 2014.

Hobgood, et al., Advanced Automatic Crash Notifications and, Urgency Factors: Can We Standardize?, APCO 2011, PowerPoint Slides, Jul. 22, 2012.

Asi, et al., Black Box System Design, Dec. 14, 2010.

Ignacio Bermudez Corrales, et al; Systems and Methods for Identifying Compromised Devices Within Industrial Control Systems; U.S. Appl. No. 14/952,344, filed Nov. 25, 2015.

Bolzoni; Poseidon: a 2-tier Anomaly-based Intrusion Detection System; http://doc.utwente.nl/54544/1/00000150.pdf, as accessed Sep. 29, 2015; International Workshop on Information Assurance, IEEE, London.

Caselli; Sequence-aware Intrusion Detection in Industrial Control Systems; CPSS'15, Proceedings of the 1st ACM Workshop on Cyber-Physical System Security, 2015.

Cisco Anomaly Guard Module; http://www.cisco.com/c/en/us/products/collateral/interfaces-modules/catalyst-6500-7600-router-anomaly-guard-module/product_data_sheet0900aecd80220a7c.html, as accessed Sep. 29, 2015; Document ID1457308823644728.

Distributed control system; https://en.wikipedia.org/wiki/Distributed_control_system, as accessed Sep. 29, 2015; Wikipedia.

Garitano; A Review of SCADA Anomaly Detection Systems; Advances in Intelligent and Soft Computing, 2016.

Ginter; Experience with Network Anomaly Detection on Industrial Networks; Industrial Control Systems Joint Working Group (ICSJWG), 2010.

(56) References Cited

OTHER PUBLICATIONS

Hadziosmanovi; N-Gram against the Machine: On the Feasibility of the N-Gram Network Analysis for Binary Protocols; Research in Attacks, Intrusions, and Defenses. 2012.
Kiss; Data Clustering-based Anomaly Detection in Industrial Control Systems; Intelligent Computer Communication and Processing, IEEE. 2014.
Mahoney; Phad: Packet Header Anomaly Detection for Identifying Hostile Network Traffic; https://cs.fit.edu/~mmahoney/paper3.pdf, as accessed Sep. 29, 2015.
Mantere; Network Traffic Features for Anomaly Detection in Specific Industrial Control System Network; Future Internet 2013, vol. 5 (6), MDPI.
Perdisci; McPAD : A Multiple Classifier System for Accurate Payload-based Anomaly Detection; https://pralab.diee.unica.it/sites/default/files/Perdisci_COMNET2009.pdf, as accessed Sep. 29, 2015; Computer Networks, vol. 53, Issue 6.
Snort (software); https://en.wikipedia.org/wiki/Snort_(software), as accessed Sep. 29, 2015; Wikipedia.
The Bro Network Security Monitor; https://www.bro.org/, as accessed Sep. 29, 2015.
Wang; Anagram: A Content Anomaly Detector Resistant to Mimicry Attack; https://mice.cs.columbia.edu/getTechreport.php?techreportID=403&format=pdf&, as accessed Sep. 29, 2015; Recent Advances in Intrusion Detection.
Wang; Anomalous Payload-based Network Intrusion Detection; http://www.covert.io/research-papers/security/PAYL%20-%20Anomalous%20Payload-based%20Network%20Intrusion%20Detection.pdf, as accessed Sep. 29, 2015; Recent Advances in Intrusion Detection.
Walter Bogorad; Systems and Methods for Detecting Anomalies That Are Potentially Indicative of Malicious Attacks; U.S. Appl. No. 15/059,326, filed Mar. 3, 2016.
Michael Sylvester Pukish, et al; Systems and Methods for Detecting Obscure Cyclic Application-Layer Message Sequences in Transport-Layer Message Sequences; U.S. Appl. No. 15/271,494, filed Sep. 21, 2016.
K. Nyalkalkar et al., "A comparative study of two network-based anomaly detection methods," in 2011 Proceedings IEEE INFOCOM, 2011.
S. Sinha et al., "WIND: Workload-Aware INtrusion Detection," in Recent Advances in Intrusion Detection, D. Zamboni and C. Kruegel, Eds. Springer Berlin Heidelberg, 2006.
L. Huang et al., "In-network PCA and anomaly detection," in In NIPS, 2006.
N. Goldenberg et al., "Accurate modeling of Modbus/TCP for intrusion detection in SCADA systems," Int. J. Crit. Infrastruct. Prot., vol. 6, No. 2, Jun. 2013.
M.-K. Yoon et al., "Communication Pattern Monitoring: Improving the Utility of Anomaly Detection for Industrial Control Systems," in Internet Society, San Diego, CA, USA, 2014.
N. Borisov et al., "Generic Application-Level Protocol Analyzer and its Language," Microsoft Research, MSR-TR-2005-133, Feb. 2005.
Zhipeng Zhao et al.; Systems and Methods for Identifying Message Payload Bit Fields in Electronic Communications; U.S. Appl. No. 15/359,076, filed Nov. 22, 2016.
"Transmission Control Protocol", http://en.wikipedia.org/wiki/Transmission_Control_Protocol, as accessed Jul. 10, 2014, Wikipedia, (Dec. 18, 2003).
A. Greenberg, "Hackers Remotely Kill a Jeep on the Highway—With Me in It," Wired, Jul. 21, 2015. [Online]. Available: http://www.wired.com/2015/07/hackers-remotely-kill-jeep-highway/. [Accessed: Mar. 30, 2016].
Aggarwal, Charu C., "Outlier Analysis", http://www.springer.com/us/book/9781461463955, as accessed Feb. 1, 2016, (2013).
Dunning, Ted et al., "Practical Machine Learning: A New Look At Anomaly Detection", https://www.mapr.com/practical-machine-learning-new-look-anomaly-detection, as accessed Feb. 1, 2016, (Jul. 21, 2014).
Yolacan, Esra N., "Learning From Sequential Data for Anomaly Detection", https://repository.library.northeastern.edu/downloads/neu:349795, as accessed Feb. 1, 2016, Dissertation, (Oct. 2014).
Wang, Jing et al., "Network anomaly detection: A survey and comparative analysis of stochastic and deterministic methods", http://ieeexplore.ieee.org/document/6759879/?arnumber=6759879, as accessed Feb. 1, 2016, 2013 IEEE 52nd Annual Conference on Decision and Control (CDC), (Dec. 10-13, 2013).
Kind, Andreas et al., "Histogram-based traffic anomaly detection", http://ieeexplore.ieee.org/document/5374831/?arnumber=5374831, as accessed Feb. 1, 2016, IEEE Transactions on Network and Service Management, vol. 6, Issue 2, (Jun. 2009).

\* cited by examiner

SYSTEMS AND METHODS FOR DETECTING ANOMALIES THAT ARE POTENTIALLY INDICATIVE OF MALICIOUS ATTACKS

BACKGROUND

Anomaly detection is often used in computer security to detect potential malicious attacks on a computing device. Traditionally, security systems may use commonly known patterns in order to match certain activities to behaviors that may indicate an attack. For example, an intrusion detection system may monitor a computing device for activities that match specific signatures of known attacks. The intrusion detection system may also determine that other behaviors are similar to how malware attacks behave and may raise an alarm for such activities.

In some cases, known malware behaviors are not available and, therefore, cannot be compared to activity on the computing device. For these cases, anomaly detection may be used to determine a baseline of normal behavior and detect when abnormal activity is present on a computing device. In anomaly detection, a security system may not need to know specific signatures in order to detect unusual activity. However, due to limited information about new threats, anomaly detection may be inaccurate in identifying behaviors that indicate an attack. Furthermore, when multiple activities need to be analyzed, detection of anomalies can become computationally complex and cause a delay in raising the alarm. Security software needs to be able to quickly and accurately detect anomalies when there is a lack of preexisting data relevant to a new attack. Accordingly, the instant disclosure identifies and addresses a need for additional and improved systems and methods for detecting anomalies that are potentially indicative of malicious attacks.

SUMMARY

As will be described in greater detail below, the instant disclosure generally relates to systems and methods for detecting anomalies that are potentially indicative of malicious attacks by examining influence relationships between events triggered during user sessions. For example, the disclosed systems may first use convolution to condense a sequence of events to a limited size. The disclosed systems may then calculate the influence of one event in the sequence on another based on the distance between the events. When cumulative influence scores for a sequence is anomalous, these systems may flag the anomalous sequence of events as a potential attack.

In one example, a computer-implemented method for detecting anomalies that are potentially indicative of malicious attacks may include (1) identifying a sequence of activities performed on a computing device, (2) calculating a cumulative influence score between pairs of activities in the sequence of activities through convolution of the sequence of activities, (3) detecting an anomaly that is potentially indicative of a malicious attack based on a comparison of the cumulative influence score and an expected threshold for a user of the computing device, and (4) in response to detecting the anomaly, performing a security action.

In one embodiment, the sequence of activities may include a sequence of single events. Additionally or alternatively, the sequence of activities may include subsequences of events. In further embodiments, convolution of the sequence of activities may include mapping the sequence of activities to a matrix of a finite size.

In some examples, calculating the cumulative influence score may include hashing at least one influence score between a first activity and a second activity in a pair of activities. In these examples, the second activity may include at least one instance of an activity following the first activity in the sequence of activities. Furthermore, in these examples, the influence score between the first activity and the second activity may include a sum of values of a monotonically decreasing function of distances between the first activity and each instance of the second activity.

In one example, the expected threshold for the user may include a minimum score for the user and/or a maximum score for the user. In this example, detecting the anomaly may include determining that the cumulative influence score is lower than the minimum score for the user and/or determining that the cumulative influence score is higher than the maximum score for the user. Additionally or alternatively, the expected threshold may include an expected sequence of activities for the user. In this example, detecting the anomaly may include determining that the sequence of activities is not the expected sequence of activities for the user.

In one embodiment, the security action may include signaling an alert and/or sending the anomaly to an administrator for review. Additionally or alternatively, the security action may include receiving confirmation of the malicious attack or receiving disconfirmation of the malicious attack. Furthermore, the security action may include preventing execution of the sequence of activities.

In some examples, the computer-implemented method may further include adding the anomaly to a whitelist of safe activities and/or a blacklist of activities indicative of an attack. Additionally or alternatively, the computer-implemented method may include adding the anomaly to a training dataset of activities for determining thresholds.

In one embodiment, a system for implementing the above-described method may include (1) an identification module, stored in memory, that identifies a sequence of activities performed on a computing device, (2) a calculation module, stored in memory, that calculates a cumulative influence score between pairs of activities in the sequence of activities through convolution of the sequence of activities, (3) a detection module, stored in memory, that detects an anomaly that is potentially indicative of a malicious attack based on a comparison of the cumulative influence score and an expected threshold for a user of the computing device, and (4) a security module, stored in memory, that, in response to detecting the anomaly, performs a security action. In addition, the system may include at least one processor that executes the identification module, the calculation module, the detection module, and the security module.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (1) identify a sequence of activities performed on the computing device, (2) calculate a cumulative influence score between pairs of activities in the sequence of activities through convolution of the sequence of activities, (3) detect an anomaly that is potentially indicative of a malicious attack based on a comparison of the cumulative influence score and an expected threshold for a user of the computing device, and (4) in response to detecting the anomaly, perform a security action.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
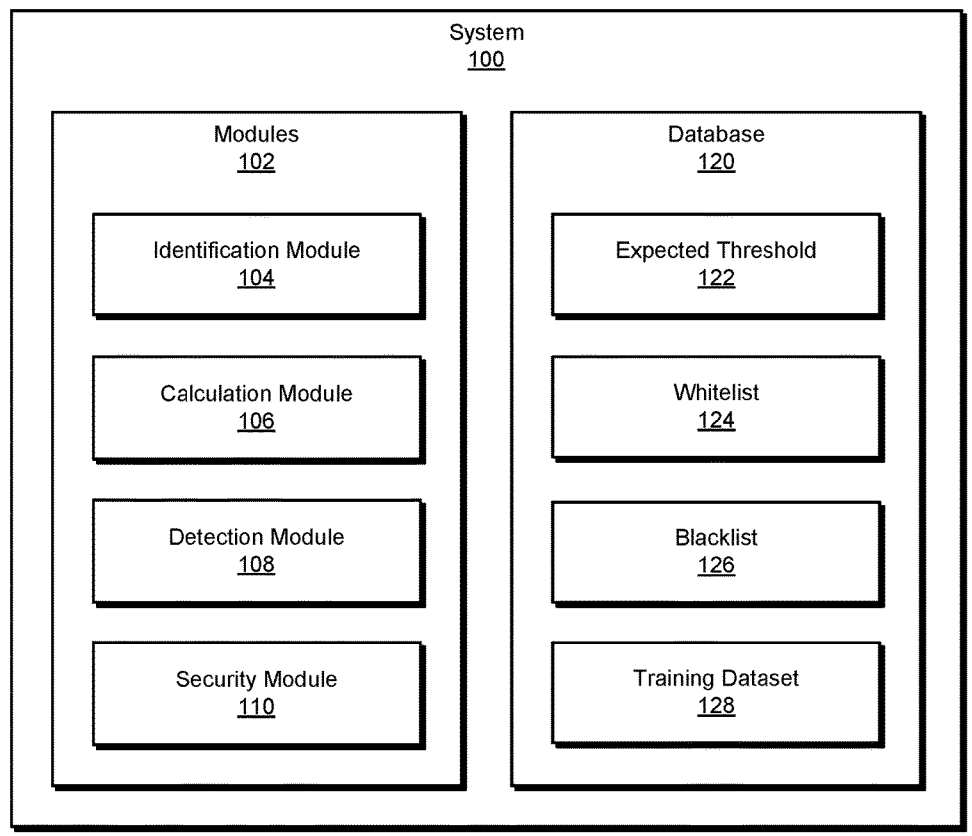
FIG. 1 is a block diagram of an exemplary system for detecting anomalies that are potentially indicative of malicious attacks.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to systems and methods for detecting anomalies that are potentially indicative of malicious attacks. As will be explained in greater detail below, by detecting anomalous sequences of activities performed on computing devices, the systems and methods disclosed herein may provide more accurate and timely detection of potential attacks. For example, by calculating the influence of activities on other activities within a sequence, the disclosed systems and methods may determine a cumulative influence relationship of the sequence. The disclosed systems and methods may then compare influence scores with expected scores for a user to identify potentially malicious activities and mitigate attacks.

Figure 2:
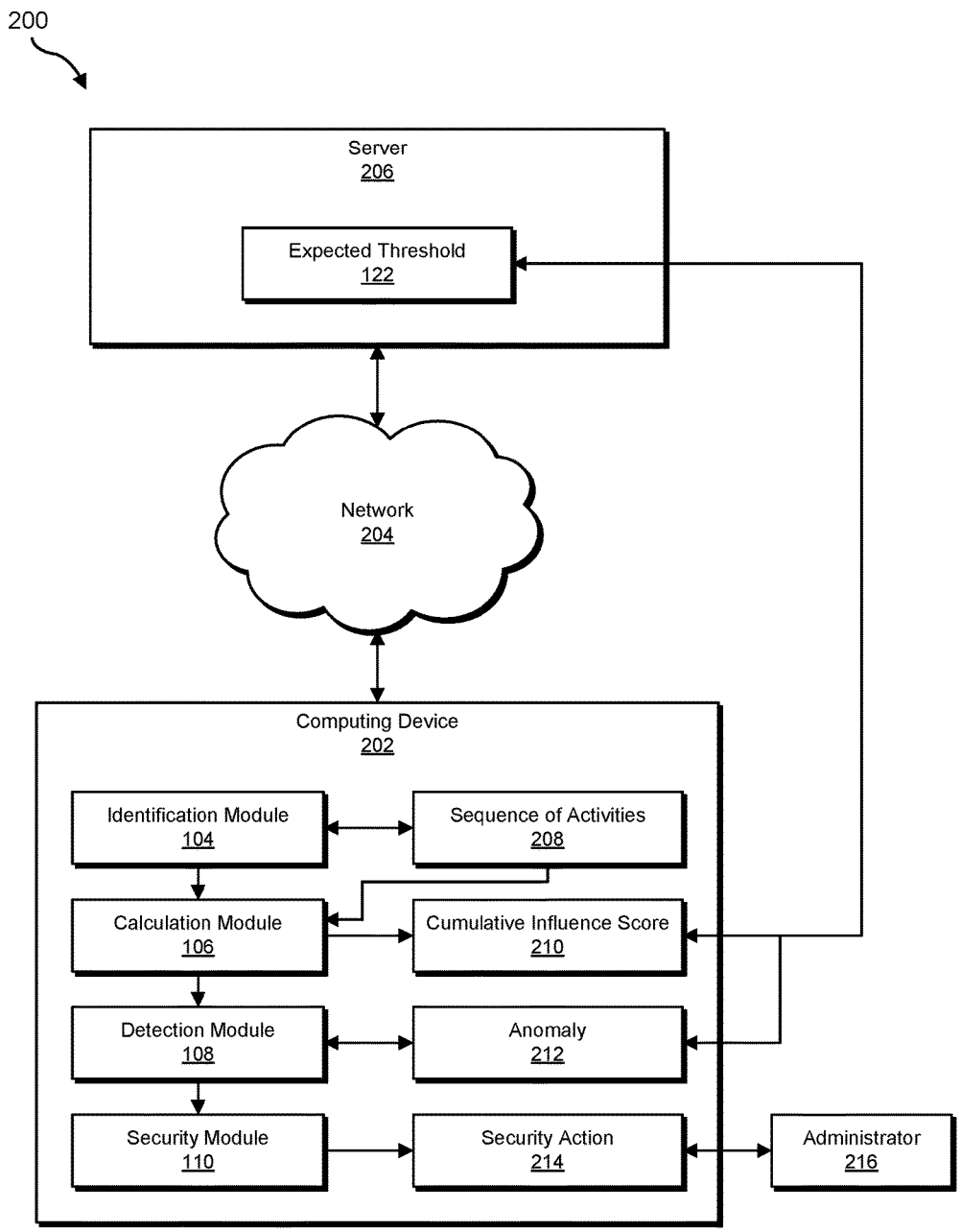
FIG. 2 is a block diagram of an additional exemplary system for detecting anomalies that are potentially indicative of malicious attacks.

The following will provide, with reference to FIGS. 1 and 2, detailed descriptions of exemplary systems for detecting anomalies that are potentially indicative of malicious attacks. Detailed descriptions of corresponding computer-implemented methods will also be provided in connection with FIG. 3. In addition, detailed descriptions of an exemplary calculation of a cumulative influence score using an exemplary matrix will be provided in connection with FIG. 4. Furthermore, detailed descriptions of an exemplary detection of an anomaly and an exemplary adjustment of an exemplary expected threshold will be provided in connection with FIG. 5. Finally, detailed descriptions of an exemplary computing system and network architecture capable of implementing one or more of the embodiments described herein will be provided in connection with FIGS. 6 and 7, respectively.

FIG. 1 is a block diagram of exemplary system 100 for detecting anomalies that are potentially indicative of malicious attacks. As illustrated in this figure, exemplary system 100 may include one or more modules 102 for performing one or more tasks. For example, and as will be explained in greater detail below, exemplary system 100 may also include an identification module 104 that may identify a sequence of activities performed on a computing device. The term "activity," as used herein, generally refers to an action performed on a computing device and/or a change in status of the computing device. Notably, an activity may include a sequence of multiple actions to perform one task.

Exemplary system 100 may additionally include a calculation module 106 that may calculate a cumulative influence score between pairs of activities in the sequence of activities through convolution of the sequence of activities. The term "influence score," as used herein, generally refers to a score measuring the influence of one activity on another activity wherein a higher score reflects two activities that are more likely related. The term "convolution," as used herein, generally refers to a method of modifying a sequence in order to condense the size and complexity of the data.

Exemplary system 100 may also include a detection module 108 that may detect an anomaly that may be potentially indicative of a malicious attack based on a comparison of the cumulative influence score and an expected threshold for a user of the computing device. Exemplary system 100 may additionally include a security module 110 that, in response to detecting the anomaly, may perform a security action. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., computing device 202 and/or server 206), computing system 610 in FIG. 6, and/or portions of exemplary network architecture 700 in FIG. 7. One or more of modules 102 in FIG. 1 may also represent all or portions of one or more special-purpose computers configured to perform one or more tasks.

As illustrated in FIG. 1, exemplary system 100 may also include one or more databases, such as database 120. In one example, database 120 may be configured to store an expected threshold 122, which may include expected influence scores for a particular user. Database 120 may also be configured to store a whitelist 124, a blacklist 126, and/or a training dataset 128, which may be used to determine expected and/or unexpected sequences of activities for the user.

Database 120 may represent portions of a single database or computing device or a plurality of databases or computing devices. For example, database 120 may represent a portion of server 206 in FIG. 2, computing system 610 in FIG. 6, and/or portions of exemplary network architecture 700 in FIG. 7. Alternatively, database 120 in FIG. 1 may represent one or more physically separate devices capable of being accessed by a computing device, such as server 206 in FIG. 2, computing system 610 in FIG. 6, and/or portions of exemplary network architecture 700 in FIG. 7.

Exemplary system 100 in FIG. 1 may be implemented in a variety of ways. For example, all or a portion of exemplary system 100 may represent portions of exemplary system 200 in FIG. 2. As shown in FIG. 2, system 200 may include a computing device 202 in communication with a server 206 via a network 204. In one example, computing device 202 may be programmed with one or more of modules 102 and/or may store all or a portion of the data in database 120. Additionally or alternatively, server 206 may be programmed with one or more of modules 102 and/or may store all or a portion of the data in database 120. Similarly, both server 206 and computing device 202 may be merged into a single machine or computing system.

In one embodiment, one or more of modules 102 from FIG. 1 may, when executed by at least one processor of computing device 202 and/or server 206, enable computing device 202 and/or server 206 to identify unusual activities that may be harmful to computing device 202. For example, and as will be described in greater detail below, identification module 104 may identify a sequence of activities 208 performed on computing device 202. Calculation module 106 may then calculate a cumulative influence score 210 between pairs of activities in sequence of activities 208 through convolution of sequence of activities 208. Detection module 108 may subsequently detect an anomaly 212 that is potentially indicative of a malicious attack based on a comparison of cumulative influence score 210 and expected threshold 122 for a user of computing device 202. Additionally, security module 110 may, in response to detecting anomaly 212, perform a security action 214.

In the example of FIG. 2, and as will be explained in greater detail below, computing device 202 may first detect sequence of activities 208 associated with a user. Computing device 202 may then use convolution to transform sequence of activities 208 and calculate cumulative influence score 210. Next, computing device 202 may compare cumulative influence score 210 with expected threshold 122 on server 206, via network 204, and determine anomaly 212 exists in sequence of activities 208. Finally, computing device 202 may execute security action 214 to notify an administrator 216 of anomaly 212 and receive further confirmation of a malicious attack.

Computing device 202 generally represents any type or form of computing device capable of reading computer-executable instructions. Examples of computing device 202 include, without limitation, laptops, tablets, desktops, servers, cellular phones, Personal Digital Assistants (PDAs), multimedia players, embedded systems, wearable devices (e.g., smart watches, smart glasses, etc.), gaming consoles, combinations of one or more of the same, exemplary computing system 610 in FIG. 6, or any other suitable computing device.

Server 206 generally represents any type or form of computing device that is capable of storing and/or managing user threshold scores and/or data on user activities, such as whitelists, blacklists, and/or training datasets. Examples of server 206 include, without limitation, application servers and database servers configured to provide various database services and/or run certain software applications.

Network 204 generally represents any medium or architecture capable of facilitating communication or data transfer. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), exemplary network architecture 700 in FIG. 7, or the like. Network 204 may facilitate communication or data transfer using wireless or wired connections. In one embodiment, network 204 may facilitate communication between computing device 202 and server 206.

Figure 3:
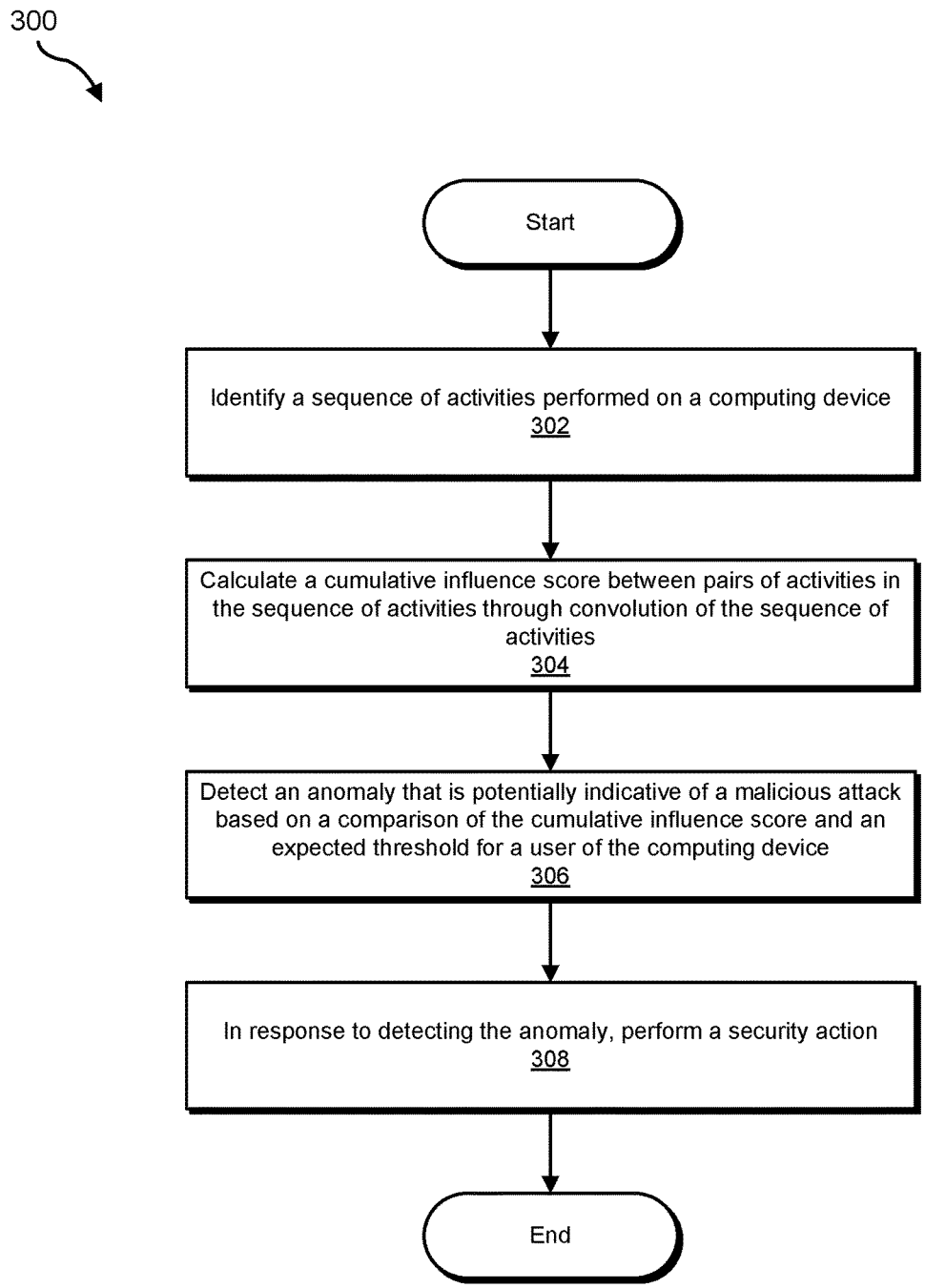
FIG. 3 is a flow diagram of an exemplary method for detecting anomalies that are potentially indicative of malicious attacks.

FIG. 3 is a flow diagram of an exemplary computer-implemented method 300 for detecting anomalies that are potentially indicative of malicious attacks. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 610 in FIG. 6, and/or portions of exemplary network architecture 700 in FIG. 7.

As illustrated in FIG. 3, at step 302, one or more of the systems described herein may identify a sequence of activities performed on a computing device. For example, identification module 104 may, as part of computing device 202 in FIG. 2, identify sequence of activities 208 performed on computing device 202.

Identification module 104 may identify sequence of activities 208 in a variety of ways. In one embodiment, sequence of activities 208 may include a sequence of single events and/or subsequences of events. The term "event," as used herein, generally refers to a computing action triggered by a user, a software, or another computing element that may be detected and handled by security software. In this embodiment, a subsequence of events may be grouped by function, size, frequency, or other attributes and identified as a single activity.

Returning to FIG. 3, at step 304, one or more of the systems described herein may calculate a cumulative influence score between pairs of activities in the sequence of activities through convolution of the sequence of activities. For example, calculation module 106 may, as part of computing device 202 in FIG. 2, calculate cumulative influence score 210 between pairs of activities in sequence of activities 208 through convolution of sequence of activities 208.

Calculation module 106 may calculate cumulative influence score 210 in a variety of ways. In some examples, calculation module 106 may calculate cumulative influence score 210 by hashing at least one influence score between a first activity and a second activity in a pair of activities. In these examples, the second activity may include at least one instance of an activity following the first activity in the sequence of activities. Furthermore, in these examples, the influence score between the first activity and the second activity may include a sum of values of a monotonically decreasing function of distances between the first activity and each instance of the second activity. As used herein, the term "monotonically decreasing function" generally refers to any mathematical function to calculate influence scores wherein scores decrease as distance between activities increase. Additionally, the influence score may depend on both distance and frequency of the second activity to the first activity.

Figure 4:
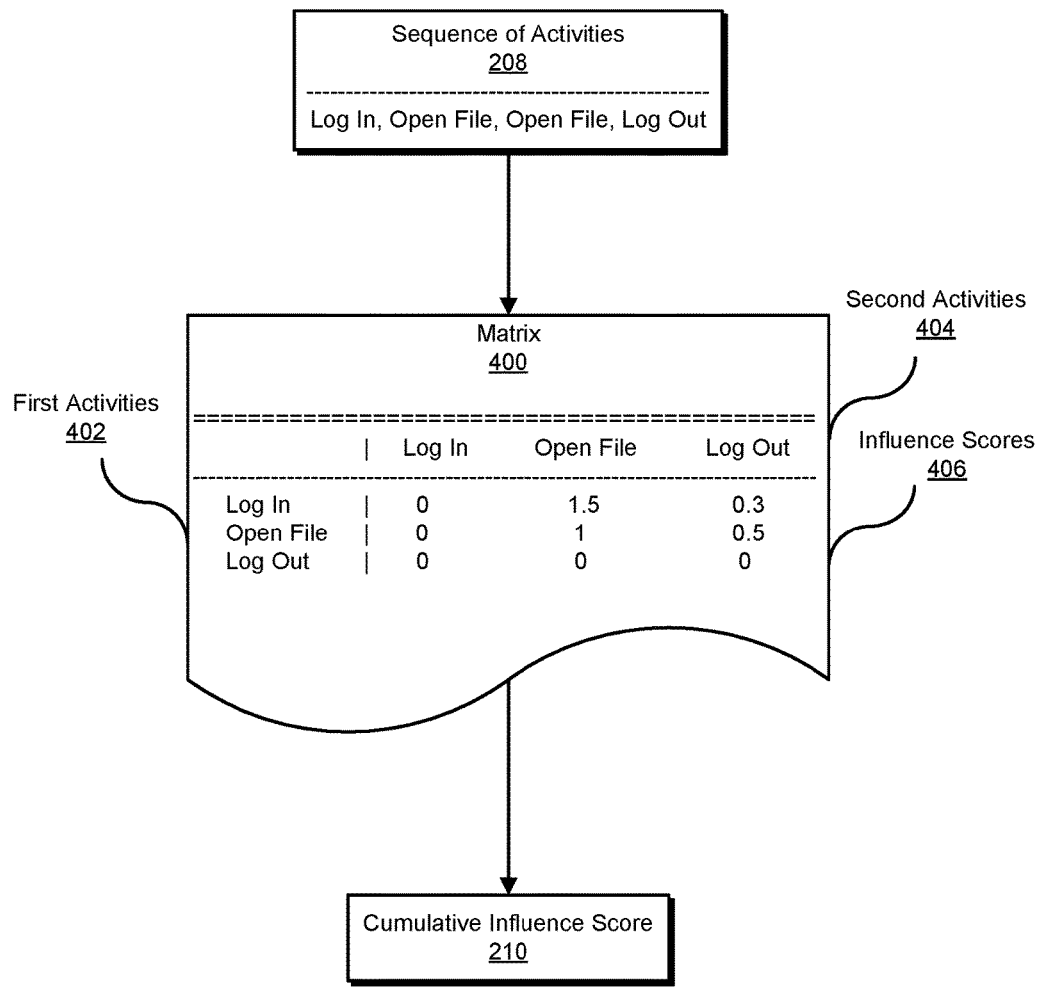
FIG. 4 is a block diagram of an exemplary calculation of a cumulative influence score using an exemplary matrix.

In one embodiment, convolution of sequence of activities 208 may include mapping sequence of activities 208 to a matrix of a finite size. For example, as shown in FIG. 4, sequence of activities 208 may include multiple activities (e.g., "log in," "open file," and "log out"). Sequence of activities 208 may then be mapped to a matrix 400 of a fixed size of nine elements. In this example, each pair of distinct activities may result in different influence scores 406 (e.g., 0, 0.3, 0.5, 1, 1.5) based on a set of second activities 404 that follow a set of first activities 402. As shown in FIG. 4, a first activity (e.g., "log in") may be followed by multiple instances of a second activity (e.g., "open file"), which may result in a higher influence score (e.g., 1.5) by adding the influence scores of each instance of the second activity. Another second activity (e.g., "log out") that is a further distance from the first activity may result in a lower influence score (e.g., 0.3). Influence scores 406 in matrix 400 may then be hashed to calculate cumulative influence score 210.

In other examples, calculation module 106 may map sequence of activities 208 to a different matrix size and/or use a different method of mapping. In the example of FIG. 4, repeated activities (e.g., "open file") may be combined as a single activity. In other examples, for large sequences of activities, infrequent events and activities may be combined to reduce the size and calculation complexity of matrix 400. Alternatively, matrix 400 may be a larger fixed size to allow for greater accuracy in determining influence scores 406. Although not shown in FIG. 4, influence scores 406 may depend on other attributes of activities and/or may be negative.

Returning to FIG. 3, at step 306, one or more of the systems described herein may detect an anomaly that is potentially indicative of a malicious attack based on a comparison of the cumulative influence score and an expected threshold for a user of the computing device. For example, detection module 108 may, as part of computing device 202 in FIG. 2, detect anomaly 212 that is potentially indicative of a malicious attack based on a comparison of cumulative influence score 210 and expected threshold 122 for a user of computing device 202.

Detection module 108 may detect anomaly 212 in a variety of ways. In one embodiment, expected threshold 122 for the user may include a minimum score for the user, a maximum score for the user, and/or an expected sequence of activities for the user. Expected threshold 122 may be a predetermined value, a value calculated based on the user's past activity on computing device 202, or a value determined using other suitable variables. For example, expected threshold 122 may include previous safe sequences of activities executed during the user's sessions on computing device 202. Without prior user information, expected threshold 122 may include a general threshold for users with the same attributes and/or expected activities derived from previous activities executed by other users, such as whitelist 124 in FIG. 1.

Additionally, in some embodiments, detection module 108 may detect anomaly 212 by determining that cumulative influence score 210 is lower than the minimum score for the user, determining that cumulative influence score 210 is higher than the maximum score for the user, and/or determining that sequence of activities 208 is not the expected sequence of activities for the user. In these embodiments, detection module 108 may detect anomaly 212 and/or calculate expected threshold 122 using statistical and machine learning methods, such as statistical distribution tests and/or regression analysis. As used herein, the term "machine learning" generally refers to computational algorithms that may learn from data in order to make predictions. Example of machine learning methods may include, without limitation, support vector machines, support vector data description, neural networks, clustering, decision trees, or any other suitable supervised, semi-supervised, or unsupervised methods.

Figure 5:
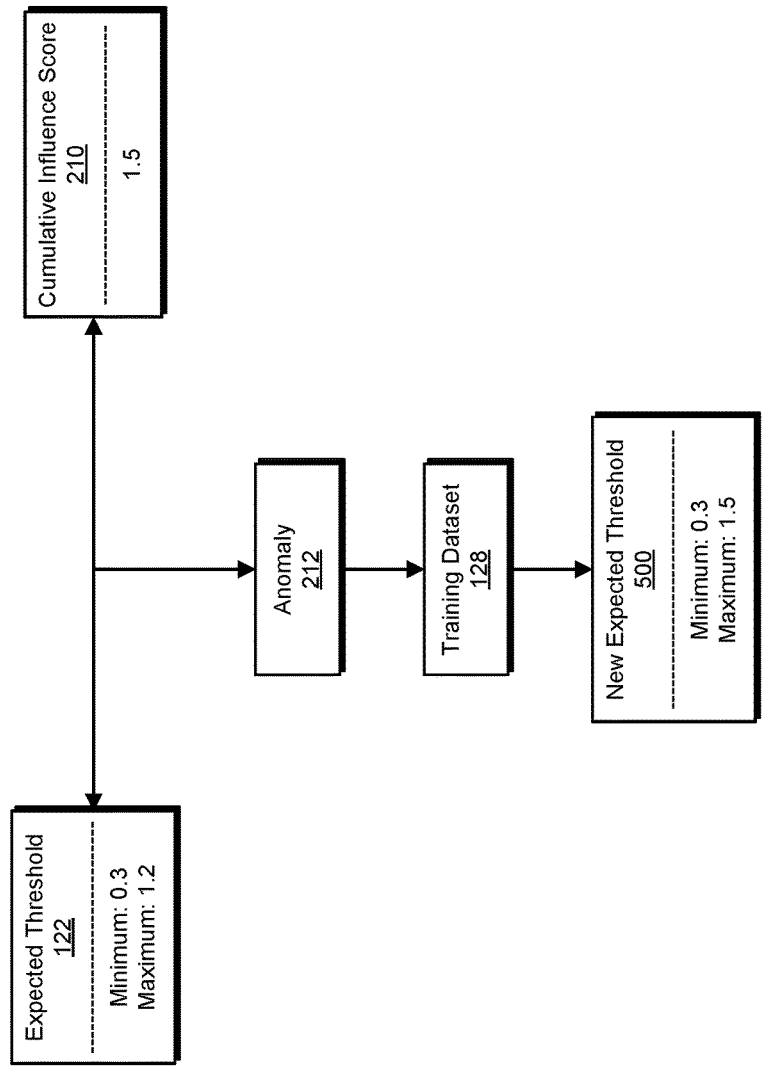
FIG. 5 is a block diagram of an exemplary detection of an anomaly and an exemplary adjustment of an exemplary expected threshold.

For example, as shown in FIG. 5, expected threshold 122 may include a minimum score (e.g., 0.3) and a maximum score (e.g., 1.2). Detection module 108 may then determine that cumulative influence score 210 (e.g., 1.5) is higher than the maximum score, resulting in detection of anomaly 212. Alternatively, in other examples, anomaly 212 may be detected if cumulative influence score 210 falls within a range of expected anomalous thresholds, such as blacklist 126 in FIG. 1. Furthermore, the range of expected scores used in expected threshold 122 may be determined by statistical variance based on a normalized range of expected activities for the user.

In the above example, anomaly 212 may include information about anomalous cumulative influence score 210. Anomaly 212 may additionally include information about anomalous sequence of activities 208. In other examples, anomaly 212 may also include information about a single anomalous influence score and/or a single anomalous activity in sequence of activities 208.

Returning to FIG. 3, at step 308, one or more of the systems described herein may, in response to detecting the anomaly, perform a security action. For example, security module 110 may, as part of computing device 202 in FIG. 2, perform security action 214.

Security module 110 may perform security action 214 in a variety of ways. In some examples, security action 214 may include signaling an alert, sending anomaly 212 to administrator 216 for review, receiving confirmation of the malicious attack, receiving disconfirmation of the malicious attack, and/or preventing execution of sequence of activities 208. In the example of FIG. 2, security module 110 may send the alert to administrator 216 and receive confirmation that anomaly 212 indicates a malicious attack. Security module 110 may then block sequence of activities 208 based on the confirmation. Additionally or alternatively, security module 110 may perform other security actions, such as preventing the user from performing sequence of activities 208, locking out the user from computing device 202, or any other method of preventing further damage from malicious attacks.

In some embodiments, one or more of the systems described herein may add anomaly 212 to whitelist 124 of safe activities, blacklist 126 of activities indicative of an attack, and/or training dataset 128 of activities for determining thresholds. The term "training dataset," as used herein, generally refers to data used in machine learning and data mining to create functions and classifiers that may make predictions on additional data. For example, the systems described herein may use a combination of various supervised and unsupervised methods to train an algorithm to detect anomalies using training dataset 128. Training dataset 128 may include examples of sequences of safe activities and/or sequences of activities indicative of malicious attacks.

In the example of FIG. 5, anomaly 212 may be added to training dataset 128, which may then be used to calculate a new expected threshold 500 for the user. In this example, if administrator 216 determines anomaly 212 is not indicative of a malicious attack, the maximum score of expected threshold 122 (e.g., 1.2) may be increased in new expected threshold 500 (e.g., 1.5) and/or sequence of activities 208 maybe be added to whitelist 124. Alternatively, anomaly 212 may confirm the range of scores for expected threshold 122 and/or improve the accuracy of expected threshold 122. Through updating training dataset 128, the systems described herein may continually improve anomaly detection with new data.

As explained above in connection with method 300 in FIG. 3, the disclosed systems and methods may, by analyzing sequential events during a user's session on a computing device, detect anomalous behavior that may indicate a malicious attack. Specifically, the disclosed systems and methods may first use convolution to convert the sequence of events into a fixed-size matrix to reduce complexity. The disclosed systems and methods may then calculate an influence score between two events by cumulatively weighting the between the events within a sequence. For example, the influence of one event on a second event may be a sum of the inverse distances between the first event and every subsequent instance of the second event. The disclosed systems and methods may further hash the influence scores of each pair of events within the sequence to obtain a cumulative influence score for the user.

The disclosed systems and methods may then determine whether the sequence of activities is anomalous for the user through a comparison of the cumulative influence score and expected thresholds. For example, activities by the user during past sessions on the computing device may result in an expected range of influence scores, and any score outside of the range may be considered anomalous. Additionally, the systems and methods described herein may perform a security action responding to the detected anomaly, such as alerting an administrator of the potential malicious attack. Furthermore, the disclosed systems and methods may improve detection of future anomalies by improving data used to create the expected thresholds for the user.

As detailed above, by performing sequence convolution to determine influence of events in a sequence, the disclosed systems and methods may detect anomalies indicative of malicious attacks with calculations of limited complexity. In addition, by comparing cumulative influence scores for a specific user account, the disclosed systems and methods may be able to detect malicious insider attacks in addition to outside attacks. Thus, the systems and methods described herein may increase accuracy and decrease computational complexity of anomaly detection used in identifying potential attacks.

Figure 6:
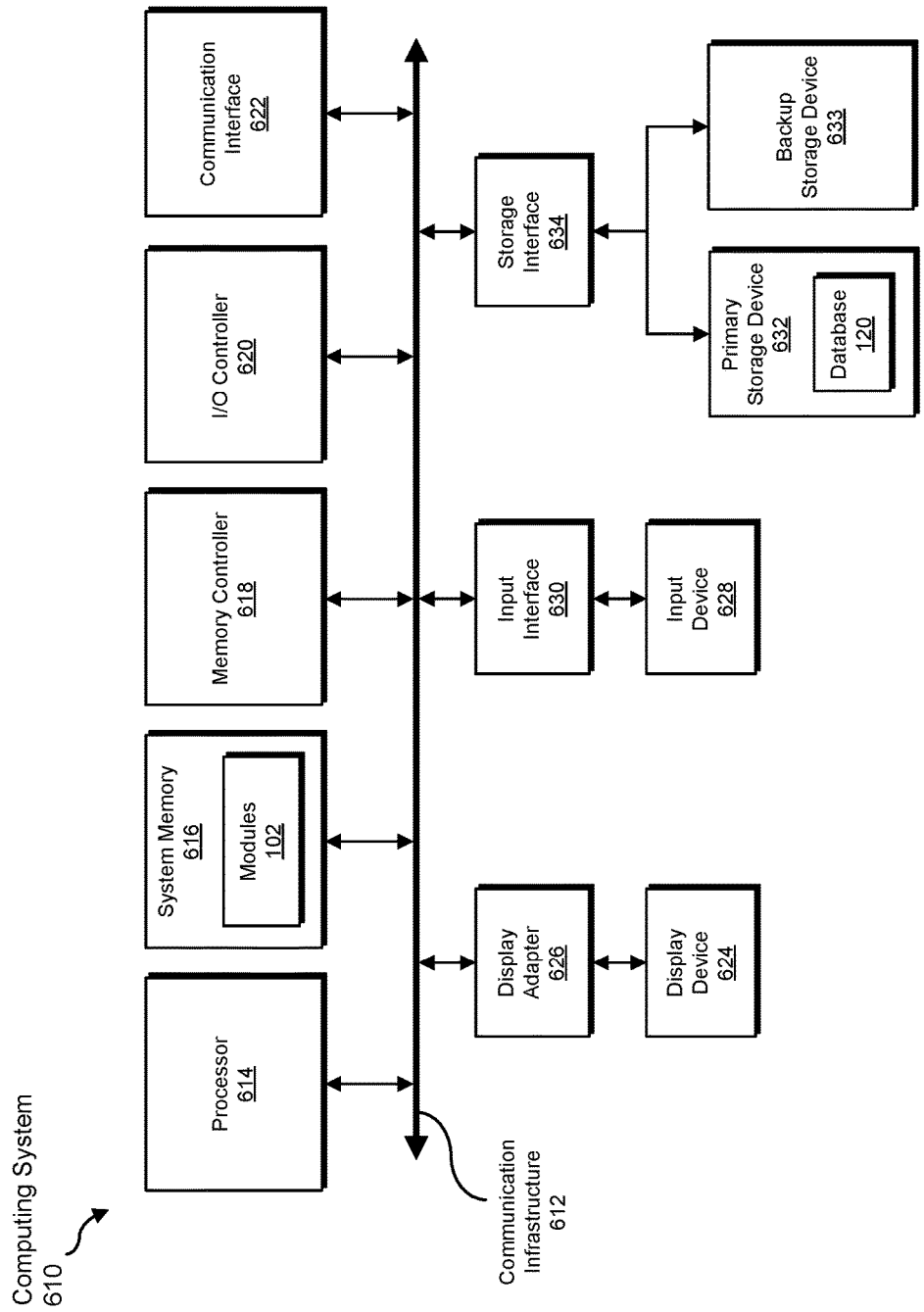
FIG. 6 is a block diagram of an exemplary computing system capable of implementing one or more of the embodiments described and/or illustrated herein.

FIG. 6 is a block diagram of an exemplary computing system 610 capable of implementing one or more of the embodiments described and/or illustrated herein. For example, all or a portion of computing system 610 may perform and/or be a means for performing, either alone or in combination with other elements, one or more of the steps described herein (such as one or more of the steps illustrated in FIG. 3). All or a portion of computing system 610 may also perform and/or be a means for performing any other steps, methods, or processes described and/or illustrated herein.

Computing system 610 broadly represents any single or multi-processor computing device or system capable of executing computer-readable instructions. Examples of computing system 610 include, without limitation, workstations, laptops, client-side terminals, servers, distributed computing systems, handheld devices, or any other computing system or device. In its most basic configuration, computing system 610 may include at least one processor 614 and a system memory 616.

Processor 614 generally represents any type or form of physical processing unit (e.g., a hardware-implemented central processing unit) capable of processing data or interpreting and executing instructions. In certain embodiments, processor 614 may receive instructions from a software application or module. These instructions may cause processor 614 to perform the functions of one or more of the exemplary embodiments described and/or illustrated herein.

System memory 616 generally represents any type or form of volatile or non-volatile storage device or medium capable of storing data and/or other computer-readable instructions. Examples of system memory 616 include, without limitation, Random Access Memory (RAM), Read Only Memory (ROM), flash memory, or any other suitable memory device. Although not required, in certain embodiments computing system 610 may include both a volatile memory unit (such as, for example, system memory 616) and a non-volatile storage device (such as, for example, primary storage device 632, as described in detail below). In one example, one or more of modules 102 from FIG. 1 may be loaded into system memory 616.

In certain embodiments, exemplary computing system 610 may also include one or more components or elements in addition to processor 614 and system memory 616. For example, as illustrated in FIG. 6, computing system 610 may include a memory controller 618, an Input/Output (I/O) controller 620, and a communication interface 622, each of which may be interconnected via a communication infrastructure 612. Communication infrastructure 612 generally represents any type or form of infrastructure capable of facilitating communication between one or more components of a computing device. Examples of communication infrastructure 612 include, without limitation, a communication bus (such as an Industry Standard Architecture (ISA), Peripheral Component Interconnect (PCI), PCI Express (PCIe), or similar bus) and a network.

Memory controller 618 generally represents any type or form of device capable of handling memory or data or controlling communication between one or more components of computing system 610. For example, in certain embodiments memory controller 618 may control communication between processor 614, system memory 616, and I/O controller 620 via communication infrastructure 612.

I/O controller 620 generally represents any type or form of module capable of coordinating and/or controlling the input and output functions of a computing device. For example, in certain embodiments I/O controller 620 may control or facilitate transfer of data between one or more elements of computing system 610, such as processor 614, system memory 616, communication interface 622, display adapter 626, input interface 630, and storage interface 634.

Communication interface 622 broadly represents any type or form of communication device or adapter capable of facilitating communication between exemplary computing system 610 and one or more additional devices. For example, in certain embodiments communication interface 622 may facilitate communication between computing system 610 and a private or public network including additional computing systems. Examples of communication interface 622 include, without limitation, a wired network interface (such as a network interface card), a wireless network interface (such as a wireless network interface card), a modem, and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network), a personal area network, a telephone or cable network, a cellular telephone connection, a satellite data connection, or any other suitable connection.

In certain embodiments, communication interface 622 may also represent a host adapter configured to facilitate communication between computing system 610 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 622 may also allow computing system 610 to engage in distributed or remote computing. For example, communication interface 622 may receive instructions from a remote device or send instructions to a remote device for execution.

As illustrated in FIG. 6, computing system 610 may also include at least one display device 624 coupled to communication infrastructure 612 via a display adapter 626. Display device 624 generally represents any type or form of device capable of visually displaying information forwarded by display adapter 626. Similarly, display adapter 626 generally represents any type or form of device configured to forward graphics, text, and other data from communication infrastructure 612 (or from a frame buffer, as known in the art) for display on display device 624.

As illustrated in FIG. 6, exemplary computing system 610 may also include at least one input device 628 coupled to communication infrastructure 612 via an input interface 630. Input device 628 generally represents any type or form of input device capable of providing input, either computer or human generated, to exemplary computing system 610. Examples of input device 628 include, without limitation, a keyboard, a pointing device, a speech recognition device, or any other input device.

As illustrated in FIG. 6, exemplary computing system 610 may also include a primary storage device 632 and a backup storage device 633 coupled to communication infrastructure 612 via a storage interface 634. Storage devices 632 and 633 generally represent any type or form of storage device or medium capable of storing data and/or other computer-readable instructions. For example, storage devices 632 and 633 may be a magnetic disk drive (e.g., a so-called hard drive), a solid state drive, a floppy disk drive, a magnetic tape drive, an optical disk drive, a flash drive, or the like. Storage interface 634 generally represents any type or form of interface or device for transferring data between storage devices 632 and 633 and other components of computing system 610. In one example, database 120 from FIG. 1 may be stored in primary storage device 632.

In certain embodiments, storage devices 632 and 633 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 633 may also include other similar structures or devices for allowing computer software, data, or other computer-readable instructions to be loaded into computing system 610. For example, storage devices 632 and 633 may be configured to read and write software, data, or other computer-readable information. Storage devices 632 and 633 may also be a part of computing system 610 or may be a separate device accessed through other interface systems.

Many other devices or subsystems may be connected to computing system 610. Conversely, all of the components and devices illustrated in FIG. 6 need not be present to practice the embodiments described and/or illustrated herein. The devices and subsystems referenced above may also be interconnected in different ways from that shown in FIG. 6. Computing system 610 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The phrase "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 610. All or a portion of the computer program stored on the computer-readable medium may then be stored in system memory 616 and/or various portions of storage devices 632 and 633. When executed by processor 614, a computer program loaded into computing system 610 may cause processor 614 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 610 may be configured as an Application Specific Integrated Circuit (ASIC) adapted to implement one or more of the exemplary embodiments disclosed herein.

Figure 7:
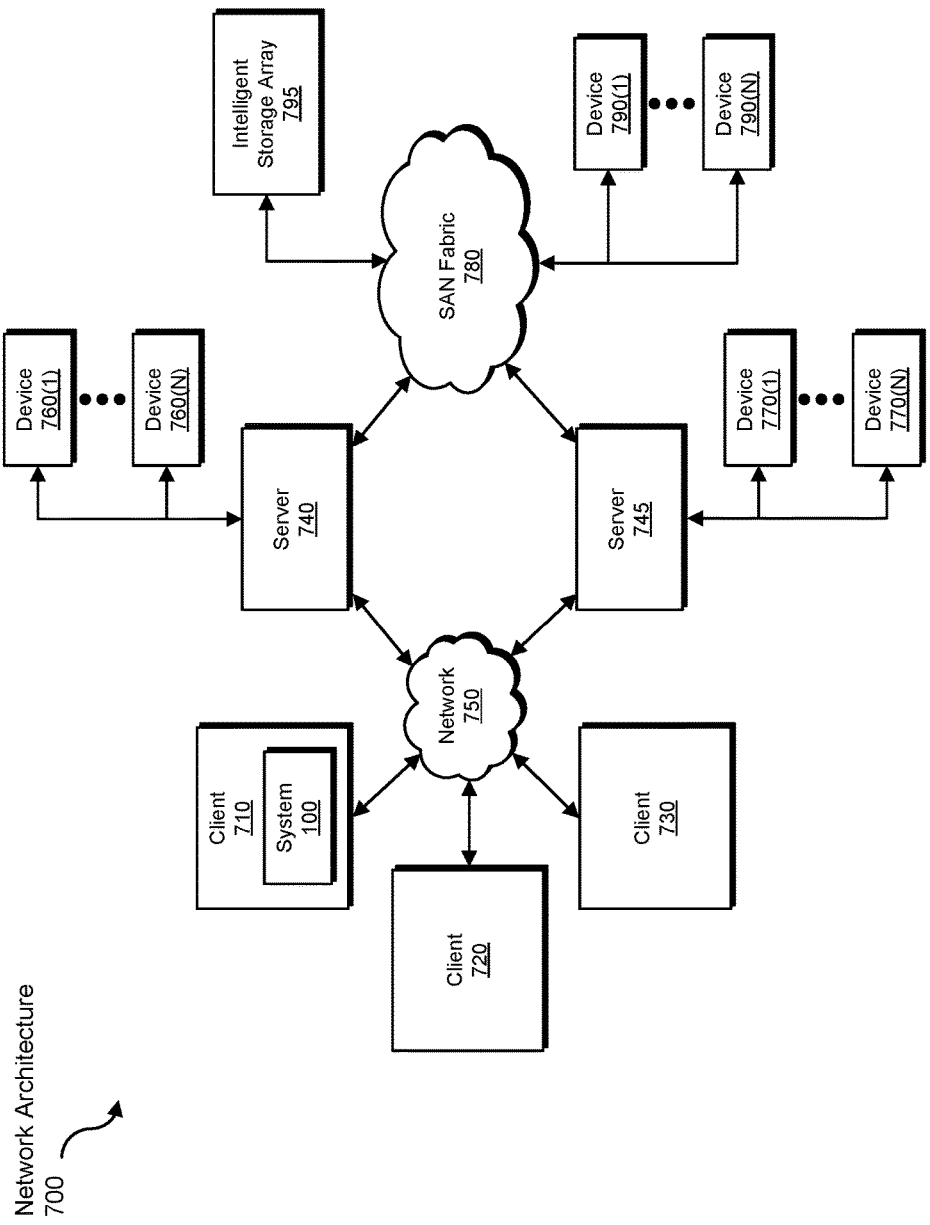
FIG. 7 is a block diagram of an exemplary computing network capable of implementing one or more of the embodiments described and/or illustrated herein.

FIG. 7 is a block diagram of an exemplary network architecture 700 in which client systems 710, 720, and 730 and servers 740 and 745 may be coupled to a network 750. As detailed above, all or a portion of network architecture 700 may perform and/or be a means for performing, either alone or in combination with other elements, one or more of the steps disclosed herein (such as one or more of the steps illustrated in FIG. 3). All or a portion of network architecture 700 may also be used to perform and/or be a means for performing other steps and features set forth in the instant disclosure.

Client systems 710, 720, and 730 generally represent any type or form of computing device or system, such as exemplary computing system 610 in FIG. 6. Similarly, servers 740 and 745 generally represent computing devices or systems, such as application servers or database servers, configured to provide various database services and/or run certain software applications. Network 750 generally represents any telecommunication or computer network including, for example, an intranet, a WAN, a LAN, a PAN, or the Internet. In one example, client systems 710, 720, and/or 730 and/or servers 740 and/or 745 may include all or a portion of system 100 from FIG. 1.

As illustrated in FIG. 7, one or more storage devices 760(1)-(N) may be directly attached to server 740. Similarly, one or more storage devices 770(1)-(N) may be directly attached to server 745. Storage devices 760(1)-(N) and storage devices 770(1)-(N) generally represent any type or form of storage device or medium capable of storing data and/or other computer-readable instructions. In certain embodiments, storage devices 760(1)-(N) and storage devices 770(1)-(N) may represent Network-Attached Storage (NAS) devices configured to communicate with servers 740 and 745 using various protocols, such as Network File System (NFS), Server Message Block (SMB), or Common Internet File System (CIFS).

Servers 740 and 745 may also be connected to a Storage Area Network (SAN) fabric 780. SAN fabric 780 generally represents any type or form of computer network or architecture capable of facilitating communication between a plurality of storage devices. SAN fabric 780 may facilitate communication between servers 740 and 745 and a plurality of storage devices 790(1)-(N) and/or an intelligent storage array 795. SAN fabric 780 may also facilitate, via network 750 and servers 740 and 745, communication between client systems 710, 720, and 730 and storage devices 790(1)-(N) and/or intelligent storage array 795 in such a manner that devices 790(1)-(N) and array 795 appear as locally attached devices to client systems 710, 720, and 730. As with storage devices 760(1)-(N) and storage devices 770(1)-(N), storage devices 790(1)-(N) and intelligent storage array 795 generally represent any type or form of storage device or medium capable of storing data and/or other computer-readable instructions.

In certain embodiments, and with reference to exemplary computing system 610 of FIG. 6, a communication interface, such as communication interface 622 in FIG. 6, may be used to provide connectivity between each client system 710, 720, and 730 and network 750. Client systems 710, 720, and 730 may be able to access information on server 740 or 745 using, for example, a web browser or other client software. Such software may allow client systems 710, 720, and 730 to access data hosted by server 740, server 745, storage devices 760(1)-(N), storage devices 770(1)-(N), storage devices 790(1)-(N), or intelligent storage array 795. Although FIG. 7 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 740, server 745, storage devices 760(1)-(N), storage devices 770(1)-(N), storage devices 790(1)-(N), intelligent storage array 795, or any combination thereof. All or a portion of one or more of the exemplary embodiments disclosed herein may also be encoded as a computer program, stored in server 740, run by server 745, and distributed to client systems 710, 720, and 730 over network 750.

As detailed above, computing system 610 and/or one or more components of network architecture 700 may perform and/or be a means for performing, either alone or in combination with other elements, one or more steps of an exemplary method for detecting anomalies that are potentially indicative of malicious attacks.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of exemplary system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of exemplary system 100 in FIG. 1 may be implemented within a virtual environment. For example, the modules and/or data described herein may reside and/or execute within a virtual machine. As used herein, the phrase "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the phrase "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of exemplary system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of exemplary system 100 in FIG. 1 may represent portions of, interact with, consume data produced by, and/or produce data consumed by one or more systems for information management. As used herein, the phrase "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of exemplary system 100 in FIG. 1 may represent portions of, produce data protected by, and/or communicate with one or more systems for information security. As used herein, the phrase "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of exemplary system 100 in FIG. 1 may represent portions of, communicate with, and/or receive protection from one or more systems for endpoint security. As used herein, the phrase "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may receive an expected threshold to be transformed, transform the expected threshold, output a result of the transformation to a storage or output device, use the result of the transformation to detect an anomaly indicative of a malicious attack, and store the result of the transformation in a server or database. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for detecting anomalies that are potentially indicative of malicious attacks, at least a portion of the method being performed by a computing device comprising at least one processor, the method comprising:
   identifying, by the computing device, a sequence of computing activities performed on the computing device;
   calculating, by the computing device, a cumulative influence score between pairs of computing activities in the sequence of computing activities through convolution of the sequence of computing activities, wherein an influence score comprises a likelihood of influence of one computing activity on another computing activity;
   detecting, by the computing device, an anomaly that is potentially indicative of a malicious attack based on a comparison of the cumulative influence score and an expected threshold for a user of the computing device; and
   in response to detecting the anomaly, performing a security action on the computing device to mitigate the malicious attack.

2. The method of claim 1, wherein the sequence of computing activities comprises at least one of:
   a sequence of single computing events; and
   subsequences of computing events.

3. The method of claim 1, wherein calculating the cumulative influence score comprises hashing at least one influence score between a first computing activity and a second computing activity in a pair of computing activities.

4. The method of claim 3, wherein the second computing activity comprises at least one instance of a computing activity following the first computing activity in the sequence of computing activities.

5. The method of claim 4, wherein the influence score between the first computing activity and the second computing activity comprises a sum of values of a monotonically decreasing function of distances between the first computing activity and each instance of the second computing activity.

6. The method of claim 1, wherein convolution of the sequence of computing activities comprises mapping the sequence of computing activities to a matrix of a finite size.

7. The method of claim 1, wherein the expected threshold for the user comprises at least one of:
 a minimum score for the user;
 a maximum score for the user; and
 an expected sequence of computing activities for the user.

8. The method of claim 7, wherein detecting the anomaly comprises at least one of:
 determining that the cumulative influence score is lower than the minimum score for the user;
 determining that the cumulative influence score is higher than the maximum score for the user; and
 determining that the sequence of computing activities is not the expected sequence of computing activities for the user.

9. The method of claim 1, wherein the security action comprises at least one of:
 signaling an alert;
 sending the anomaly to an administrator for review;
 receiving confirmation of the malicious attack;
 receiving disconfirmation of the malicious attack; and
 preventing execution of the sequence of computing activities.

10. The method of claim 1, further comprising adding the anomaly to at least one of:
 a whitelist of safe computing activities;
 a blacklist of computing activities indicative of an attack; and
 a training dataset of computing activities for determining thresholds.

11. A system for detecting anomalies that are potentially indicative of malicious attacks, the system comprising:
 an identification module, stored in memory, that identifies a sequence of computing activities performed on a computing device;
 a calculation module, stored in memory, that calculates a cumulative influence score between pairs of computing activities in the sequence of computing activities through convolution of the sequence of computing activities, wherein an influence score comprises a likelihood of influence of one computing activity on another computing activity;
 a detection module, stored in memory, that detects an anomaly that is potentially indicative of a malicious attack based on a comparison of the cumulative influence score and an expected threshold for a user of the computing device;
 a security module, stored in memory, that, in response to detecting the anomaly, performs a security action on the computing device to mitigate the malicious attack; and
 at least one processor that executes the identification module, the calculation module, the detection module, and the security module.

12. The system of claim 11, wherein the sequence of computing activities comprises at least one of:
 a sequence of single computing events; and
 subsequences of computing events.

13. The system of claim 11, wherein the calculation module calculates the cumulative influence score by hashing at least one influence score between a first computing activity and a second computing activity in a pair of computing activities.

14. The system of claim 13, wherein the second computing activity comprises at least one instance of a computing activity following the first computing activity in the sequence of computing activities.

15. The system of claim 14, wherein the influence score between the first computing activity and the second computing activity comprises a sum of values of a monotonically decreasing function of distances between the first computing activity and each instance of the second computing activity.

16. The system of claim 11, wherein convolution of the sequence of computing activities comprises mapping the sequence of computing activities to a matrix of a finite size.

17. The system of claim 11, wherein the expected threshold for the user comprises at least one of:
 a minimum score for the user;
 a maximum score for the user; and
 an expected sequence of computing activities for the user.

18. The system of claim 17, wherein the detection module detects the anomaly by at least one of:
 determining that the cumulative influence score is lower than the minimum score for the user;
 determining that the cumulative influence score is higher than the maximum score for the user; and
 determining that the sequence of computing activities is not the expected sequence of computing activities for the user.

19. The system of claim 11, wherein the security action comprises at least one of:
 signaling an alert;
 sending the anomaly to an administrator for review;
 receiving confirmation of the malicious attack;
 receiving disconfirmation of the malicious attack; and
 preventing execution of the sequence of computing activities.

20. A non-transitory computer-readable medium comprising one or more computer-executable instructions that, when executed by at least one processor of a computing device, cause the computing device to:
 identify a sequence of computing activities performed on the computing device;
 calculate a cumulative influence score between pairs of computing activities in the sequence of computing activities through convolution of the sequence of computing activities, wherein an influence score comprises a likelihood of influence of one computing activity on another computing activity;
 detect an anomaly that is potentially indicative of a malicious attack based on a comparison of the cumulative influence score and an expected threshold for a user of the computing device; and
 in response to detecting the anomaly, perform a security action on the computing device to mitigate the malicious attack.

* * * * *